United States Patent

Nakayama

[11] 3,714,295
[45] Jan. 30, 1973

[54] PROCESS FOR PREPARING GRAFT-COPOLYMERS

[75] Inventor: Yasuharu Nakayama, Kanagawa-ken, Japan

[73] Assignee: Kansai Paint Company Limited, Amagasaki-shi, Japan

[22] Filed: Feb. 2, 1971

[21] Appl. No.: 112,091

[30] Foreign Application Priority Data

Feb. 7, 1970 Japan..........................45/11020

[52] U.S. Cl..........260/879, 260/78.4 D, 260/78.5 T, 260/874, 260/880 R, 260/881, 260/885, 260/886

[51] Int. Cl.......C08f 15/00, C08f 19/00, C08f 15/10

[58] Field of Search ....260/879, 78.4 D, 78.5 T, 874, 260/880 R

[56] References Cited

UNITED STATES PATENTS

| | | | |
|---|---|---|---|
| 3,462,516 | 8/1969 | Smith et al. | 260/887 |
| 3,567,691 | 3/1971 | Van Breen et al. | 260/78.4 |

Primary Examiner—James A. Seidleck
Assistant Examiner—William F. Hamrock
Attorney—Larson, Taylor and Hinds

[57] ABSTRACT

A process for manufacturing a graft-copolymer comprises copolymerizing (a) a hydrocarbon polymer having carbon-carbon double bonds in the molecule with (b) a maleic anhydride compound represented by the formula of

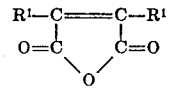

wherein $R^1$ is hydrogen atom, halogen atom or methyl group and (c) a compound having in the molecule a vinyl ether group of the formula of

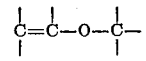

The present copolymer is useful as paint, adhesives, etc.

11 Claims, No Drawings

PROCESS FOR PREPARING GRAFT-COPOLYMERS

This invention relates to novel graft-copolymers and method of preparing the same.

Main object of the invention is to provide novel graft-copolymers which are useful for various uses, particularly as paints, adhesives, etc. and to provide a method for manufacturing such copolymers.

The copolymer of this invention is prepared by copolymerizing (a) a hydrocarbon polymer having carbon-carbon double bonds in the molecule with (b) a maleic anhydride compound represented by the formula of

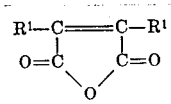

wherein $R^1$ is hydrogen atom, halogen atom or methyl group and (c) a vinyl ether compound having in the molecule a vinyl ether group of the formula of

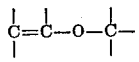

The graft-copolymers of the present invention are novel polymers which have not been disclosed in literatures. Since a maleic anhydride compound (b) and vinyl ether compound (c) are incorporated by graft-copolymerization in a hydrocarbon polymer (a) having carbon-carbon doluble bonds, a hydrophobic portion and a hydrophilic portion are present in the molecule of the graft-compolymer of the present invention. Accordingly, the graft-copolymer is particularly useful as a stable emulsion paint and adhesive. With many double bonds allowed to remain in the copolymer produced, the copolymer dries well in the air when used as a paint, hence the copolymer makes a paint of air-drying type. The molecular weight of the hydrophobic portion which is present in the molecule of the present copolymer can be controlled as desired by the molecular weight of the hydrocarbon polymer (a) used, while the molecular weight of the hydrophilic portion can be controlled by the amounts of maleic anhydride compound (b) and vinyl ether compound (c) used, the proportion of these components, polymerization conditions and the like. Thus it is easy to produce polymers which have suitable properties in accordance with uses.

The hydrocarbon polymers (a) to be used in this invention are those having carbon-carbon double bonds in the polymer main chain and/or side chain, representative examples thereof being polymers of dienes such as butadiene, isoprene, chloroprene and the like (including 1,2-polymer and 1,4-polymer both in cis form and trans form), raw rubber, guttapercha, balata, chicle, acetylene copolymer and copolymers of these compounds. These polymers may not necessarily be composed solely of carbon and hydrogen but may contain in the molecule nitrile, ester, carboxyl or like groups as a side chain. A benzene ring may also be present on side chain. Polymers having such side chains may be obtained by copolymerizing a diene and/or acetylene with another monomer. Examples of such monomer to be used for copolymerization are unsaturated nitrile compounds represented by the formula

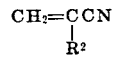

wherein $R^2$ is hydrogen or methyl; unsaturated acids and alkyl esters thereof represented by the formula

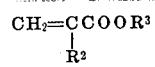

wherein $R^2$ is the same as above and $R^3$ is hydrogen or alkyl having 1 to 5 carbon atoms; styrenes represented by the formula

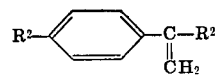

wherein $R^2$ is the same as above; and maleic anhydrides represented by the formula

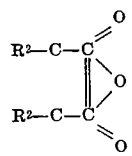

wherein $R^2$ is the same as before. The copolymerization ratio of the copolymerizable monomer to the diene and/or acetylene may vary over a wide range, but the resultant polymer used as a starting hydrocarbon polymer (a) in the invention should contain at least 20 percent by weight, preferably more than 50 percent by weight, of diene and/or acetylene.

Of these hydrocarbon polymers (a) preferable are those having a bromine value of about 50 to 300, preferably about 150 to 300 and a molecular weight of 200 to 300,000 preferably 500 to 50,000. The most preferable are polybutadienes having a bromine value of 50 to 300, preferably 150 to 300, and molecular weight of 200 to 300,000, preferably 500 to 50,000 and containing in the molecule -vinyl type butadiene in the amount of at least 10 percent by weight.

The maleic anhydride compound (b) includes, besides maleic anhydride, halogen- or methyl-substituted maleic anhydrides such as monochloromaleic anhydride, monomethylmaleic anhydride, dimethylmaleic anhydride and the like. Of these compounds maleic anhydride is most preferable.

The vinyl ether compound (c) includes compounds having vinyl ether group

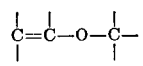

in the molecule, representative examples thereof being as follows:

I. Vinyl ethers represented by the formula

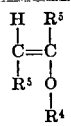

wherein $R^4$ is an alkyl having one to 17 carbon atoms or a halogenated alkyl having one to 17 carbon atoms, and $R^5$ is hydrogen or an alkyl having one or two carbon atoms;

II. Alicyclic vinyl ethers represented by the formula

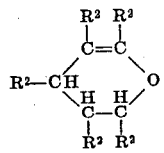

wherein $R^2$ is the same as before;

III. Furan compounds represented by the formula

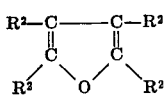

wherein $R^2$ is the same as before; and

IV. Dioxene compounds represented by the formula

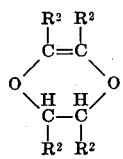

wherein $R^2$ is the same as before.

Of these vinyl ether compounds, particularly those having a substituent of small molecular weight can be made into a resin which is more useful as an emulsion paint. From this viewpoint, it is most preferable to use vinyl ethers such as methyl vinyl ether, ethyl vinyl ether, propyl vinyl ether and butyl vinyl ether.

The graft-copolymers of the invention can be produced by copolymerizing the above three components, i.e., a) hydrocarbon polymers, b) maleic anhydride compounds and c) vinyl ether compounds. Though the amount ratio of the three components to be copolymerized may vary over a wide range in accordance with the uses of the resultant graft-copolymer obtained, it is preferable 100 parts by weight of hydrocarbon polymer (a) is copolymerized with 5 to 300 parts by weight, preferably 10 to 200 parts by weight, of maleic anhydride compound (b) and 5 to 300 parts by weight, preferably 10 to 200 parts by weight of vinyl either compound (c).

The copolymerization reaction may be carried out at $-20°$ to $220°C$ in the presence or absence of a radical polymerization initiator. When the initiator is used the reaction temperature of $-20°$ to $150°C$, preferably $0°$ to $130°C$, is usually applied, while in the case that the initiator is not employed the temperature of $120°$ to $220°C$ is generally applied. The radical polymerization initiator which promotes the present copolymerization reaction is any of the initiators usually used in the radical polymerization, examples of the initiator being benzoyl peroxide ($C_6H_5COOOCOC_6H_5$) and nuclear substitutions compounds thereof, diaroyl peroxides (R-COOOCOR), dialkyl peroxides (ROOR), alkylhydro peroxides (ROOH), peracids (RCOOOH), azobisnitriles ($R_2C(CN)N=NC(CN)R_2$), azobis-substituted alkanes ($XCH_2N=NCH_2X$), tetraalkylthiuram monosulfides ($R_2NC(S)SO(S)NR_2$), tetraalkylthiuram disulfides ($R_2NC(S)SSC(S)NR_2$), tributyl boron (n-$CH_3CH_2CH_2CH_2$)$_3$B and the like. Irradiation with ionizing radiation such as gamma rays, electron rays or ultraviolet rays also promotes radical copolymerization.

The copolymerization reaction of the invention may preferably be conducted in the presence of organic solvents. As the solvent any of those usually employed in radical polymerization reactions can be used. Examples of the organic solvent useful in the invention are (i) aromatic hydrocarbons such as benzene, toluene, xylene, mesitylene, cumene, etc.; (ii) ethers such as dioxane, methyl ether, ethyl ether, etc; (iii) halogenated hydrocarbons such as chloroform, dichloromethane, dichloroethane, trichloroethane, tetrachloromethane, tetrachloroethane, etc.; (iv) esters such as ethylacetate, methylacetate, methyl formate, ethyl formate, etc.; (v) acid-type solvents such as acetic acid, acetic anhydride, etc.; (vi) ketones such as acetone, methyl ethyl ketone, methyl isobutyl ketone, cyclohexanone, etc.; and (vii) aliphatic hydrocarbons such as petroleum ether, cyclohexane, n-hexane, pentane, etc.

The organic solvents may preferably be used in such an amount as to keep the reaction mixture at a concentration of not lower than 5 percent by weight.

The present copolymerization reaction may preferably be carried out under atmospheric pressure, although increased or reduced pressures are applicable.

Although the mechanism of the radical copolymerization reaction in accordance with this invention has not been clarified yet, it is assumed that the polymer (a) having the carbon-carbon double bonds and the maleic anhydride compound (b) form a molecular complex (hereinafter referred to as a "complex A") and that the maleic anhydride compound (b) and the vinyl ether compound (c) form a molecular complex (hereinafter referred to as a "complex B"), these complexes A and B being then copolymerized into a graft-copolymer of this invention. Accordingly, the polymerization degree of the graft portions and the degree of cross linking of the graft-copolymer formed are heavily dependent on the kind of solvent used and amounts of the polymer (a) having carbon-carbon double bonds, maleic anhydride compound (b) and vinyl ether compound (c) used. More specifically, the amount of the complexes is proportional to the second power of the amount of each component, i.e. polymer (a) having carbon-carbon double bonds, maleic anhydride compound (b) and vinyl ether compound (c). Further the polarity, donor property and acceptor property of the solvent used exert a significant influence on the concentration of the molecular complexes. For instance, the complex A is present in greater amount in dichloroethane which has none of polarity, donor property and acceptor property than in benzene which has donor property, so that the resultant graft-copolymer contains greater amount of polybutadiene in the polymer.

In order to control the cross linking reaction and thereby adjust the molecular weight of the resultant graft-copolymer chain transfer agents may be added to the reaction system. The chain transfer agent to be used includes five member cyclic ethers such as tetrahydrofuran and its derivatives represented by the formula of

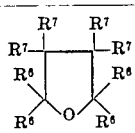

wherein $R^6$ and $R^7$ are hydrogen, halogen, alkyl having one to two carbon atoms, halogenated methyl or phenyl, and at least one $R^6$ must be hydrogen; and dioxolan and its derivatives represented by the formula of

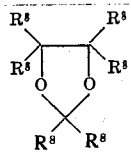

wherein $R^8$ is hydrogen or alkyl having one or two carbon atoms, and at least one of them must be hydrogen. Examples of these compounds are tetrahydrofuran, 2-methyl tetrahydrofuran, 2-ethyl tetrahydrofuran, 3-methyl tetrahydrofuran, 2,2-dimethyl tetrahydrofuran, 2,5-dimethyl tetrahydrofuran, 2,3-transdichlorotetrahydrofuran 2-chloromethyl tetrahydrofuran, 2-phenyl tetrahydrofuran and like tetrahydrofurans, and dioxolan, 2-methyl dioxolan, 2,2-dimethyl dioxolan, 2,4-dimethyl dioxolan, 2-ethyl dioxolan and the like dioxolans. The chain transfer agent is used in the amount of not more than 40 percent by weight based on the total weight of the starting materials to be copolymerized.

The graft-copolymers obtained according to the method of the invention are usually liquid at room temperature or rubber-like substances having a glass transition temperature of lower than room temperature. Particularly preferable graft-copolymers are those having an acid value of 30 to 500 and a bromine value of 150 to 290 and capable of cross-linking at elevated temperatures.

For better understanding of the invention examples are given below.

Example 1

In 50 ml of benzene were dissolved 5 g of polybutadiene A (comprising 91.4 mol percent of 1,2-polymer and 8.6 mol percent of 1,4-polymer in trans form and having a molecular weight of 1400), 5 g of maleic anhydride (hereinafter referred to as "MAH"), 3.9 g of isobutyl vinyl ether (hereinafter referred to as "IBVE"), 2 ml of tetrahydrofuran (hereinafter referred to as "THF"), and 10 mg of benzoyl peroxide (hereinafter referred to as "BPO"), and the solution was placed in a polymerization tube made of glass. After substituting nitrogen gas for the air in the tube, the solution was heated at 60°C for 2 hours by a thermostatic water bath so as to effect radical polymerization. After the reaction the resultant copolymer of this invention (hereinafter referred to as "copolymer") was precipitated in methanol and recovered after being left to stand in methanol for one day. (Copolymers were all recovered in this manner in the following Examples). Elementary analysis of the resulting copolymer showed that it was made up of 9.5 wt.% of hydrogen and 76.3 wt.% of carbon. When ammonia water was added to the copolymer, and emulsion having good stability was produced.

Example 2

5 g of polybutadiene A, 5 g of MAH, 3.9 g of IBVE, 5 ml of THF and 10 mg of BPO were dissolved in 50 ml of benzene and the solution was reacted in the same manner as in Example 1. The result of elementary analysis conducted on the copolymer obtained showed that it was made up of 10.3 wt.% of hydrogen and 80.3 wt.% of carbon. Addition of ammonia water to the copolymer gave a stable emulsion.

Example 3

20 g of polybutadiene A and 10 ml of THF were dissolved in 100 ml of toluene, and the solution was placed in a three-necked flask and boiled for 3 hours with stirring. 50 ml of a toluene solution containing 3.1 g of IBVE and 5 g of MAH and 50 ml of another toluene solution containing 50 mg of BPO were separately added dropwise to the boiling solution in the three-necked flask. The dropwise addition of the solution was conducted by adding 1/10-portion of each solution every 30 minutes. The result of elementary analysis on the copolymer obtained showed that it comprised 10.9 wt.% of hydrogen and 83.8 wt.% of carbon.

Example 4

In 60 mg of benzene were dissolved 20 g of polybutadiene A, 10 g of MAH, 7.9 of IBVE, 20 ml of THF and 40 mg of $\alpha,\alpha'$-azoisobutyronitrile (hereinafter referred to as "AIBN"), and the solution was reacted in the same manner as in Example 1, except that the reaction temperature was maintained at 60°C for 4 hours. Although the viscosity of the system increased during reaction, no gelling was observed to take place. The result of elementary analysis on the copolymer recovered showed that it comprised 9.9 wt% of hydrogen and 76.3 wt.% of carbon.

Example 5

5 g of polybutadiene A, 2 g of furan, 2.5 g of MAH and 100 mg of AIBN were dissolved in 50 ml of benzene, and the solution thus prepared was placed in a polymerization tube made of glass. After the air in the tube was replaced with nitrogen gas the tube was irradiated with ultraviolet rays for 10 hours at 25°C by means of a 75-watt high-pressure mercury lamp to effect radical copolymerization, with the tube spaced apart from the lamp by 5 cm. The result of elementary analysis on the copolymer recovered showed that it comprised 5.3 wt.% of hydrogen and 80.8 wt.% of carbon.

Example 6

In 45 ml of benzene were dissolved 5 g of polybutadiene A, 5 g of MAH, 3.5 g of ethyl vinyl ether (hereinafter referred to as "EVE") and 5 ml of THF.

The solution thus prepared was reacted in the same manner as in Example 5, except that the irradiation with ultraviolet rays was conducted at 25°C at a distance of 2 cm for 3 hours. The result of elementary analysis on the copolymer thus obtained showed that it was made up of 10.3 wt.% of hydrogen and 76.0 wt.% of carbon. Addition of ammonia water to the copolymer gave an emulsion having excellent stability.

Example 7

5 g of polybutadiene A, 5 g of MAH, 4 g of EVE and 5 ml of THF were dissolved in 45 ml of benzene, and the solution thus prepared was placed in a polymerization tube. After substituting nitrogen gas for the air in the tube, the tube was irradiated with gamma-ray of 1.5 × $10^6$ γ using cobalt 60. The polymerized system, in the form of jelly, was then left to stand in methanol for about 2 days. The result of elementary analysis on the copolymer recovered showed that it comprised 8.7 wt.% of hydrogen and 61.9 wt.% of carbon.

Example 8

5 g of polybutadiene A, 5 g of MAH, 5 ml of THF, 50 ml of toluene, 10 mg of AIBN and 3.5 g of methyl vinyl ether were charged into a polymerization tube made of glass. After replacing the air in the tube with nitrogen gas, the glass tube was sealed. The sealed tube, then placed in a metal protecting container, was immersed in a thermostatic water bath of 50°C and heated for 5 hours. The resulting polymer was precipitated in methanol and left to stand for 1 day. To the polymer then dissolved in triethylamine was added water, whereby a stable emulsion was obtained. Elementary analysis of the polymer gave 11.0 wt.% of hydrogen and 84.1 wt.% of carbon.

Examples 9 to 16

Each solution with the composition given in Table 1 was placed in a polymerization tube. After substituting nitrogen gas for the air in the tube, the solution was heated at 60°C for 2 hours to effect radical copolymerization. The yield of the copolymer recovered, result of elementary analysis and comparison of viscosity of the polymerization system are listed in Table 1.

Example 17

In 50 ml of benzene were dissolved 5 g of polybutadiene B, 5 g of methylmaleic anhydride, 3.9 g of IBVE and 10 mg of BPO, and the solution thus prepared was subjected to radical copolymerization in the same manner as in Example 1. When the resultant polymerization mixture was placed in methanol, the mixture was partially dispersed and was not precipitated even when left to stand for 3 days. The amount of the copolymer recovered was 4.5 g and elementary analysis thereon gave 10.2 wt.% of hydrogen and 87.2 wt.% of carbon.

Example 18

In 50 ml of benzene were dissolved 5 g of polybutadiene B, 5 g of MAH, 4 g of dihydropyrane and 10 mg of BPO and the solution thus prepared was subjected to radical copolymerization in the same manner as in Example 1. During the polymerization reaction, there was hardly any change in viscosity. The yield of the copolymer recovered was 5.16 g, the result of elementary analysis thereon being 11.3 wt.% of hydrogen and 85.9 wt.% of carbon.

Example 19

In 10 ml of xylene were dissolved 2 g of polybutadiene B, 2 g of MAH and 2 g of n-octadecyl vinyl ether and the resulting solution was placed in a flask. After replacing the air in the flask with nitrogen gas, the solution was heated for 2.5 hours at the boiling point of xylene, with the resulting increase in the viscosity of the polymerization system. The resultant mixture was then dissolved in THF and reprecipitated in methanol. After having been left to stand for 1 day, the polymer was recovered in a yield of 2.35 g. The result of elementary analysis showed that it comprised 10.8 wt.% of hydrogen and 79.8 wt.% of carbon.

Comparison Examples 1 to 3

Polymerization was conducted in the same manner as in Example 9 using the materials shown in Table 2. The results are given in Table 2.

TABLE 1

| Example number | Components | | | | | | | | Result | | | |
|---|---|---|---|---|---|---|---|---|---|---|---|---|
| | Polybutadiene *1 B (g.) | MAH (g.) | IBVE (g.) | BPO (mg.) | Solvent | | Chain transfer agent | | Yield (g.) | Elementary analysis | | Comparison of viscosity of polymerization system (η rel.) |
| | | | | | Name | Amount (ml.) | Name | Amount (ml.) | | H (percent) | C (percent) | Before polymerization / After polymerization |
| 9 | 5 | 5 | 3.9 | 10 | BZ *2 | 50 | — | — | 8.8 | 9.9 | 76.6 | 3.2 / 14.0 |
| 10 | 5 | 5 | 3.9 | 10 | BZ | 45 | THF | 5 | 6.7 | 10.0 | 75.7 | 3.2 / 8.1 |
| 11 | 5 | 5 | 3.9 | 10 | BZ | 40 | THF | 10 | 5.6 | 9.0 | 82.3 | 3.2 / 5.8 |
| 12 | 5 | 5 | 3.9 | 50 | BZ | 45 | THF | 5 | 7.6 | 10.1 | 76.8 | 3.1 / 14.2 |
| 13 | 5 | 5 | 3.9 | 10 | DCE *3 | 45 | THF | 5 | 7.1 | 10.4 | 79.4 | 3.0 / 33.4 |
| 14 | 5 | 5 | 3.9 | 10 | DO *4 | 45 | THF | 5 | 6.9 | 10.0 | 76.2 | 3.3 / 12.5 |
| 15 | 5 | 5 | 3.9 | 10 | BZ | 45 | Me*5–THF | 5 | 6.0 | 10.0 | 77.4 | 3.5 / 6.3 |
| 16 | 5 | 5 | 3.9 | 10 | BZ | 45 | Dioxolan | 5 | 5.5 | 10.4 | 79.7 | 3.4 / 4.9 |

Note: (*1) Polybutadiene B: 92.3 mol percent 1,2-polymer, 7.7 mol percent 1,4-polymer in trans form, average molecular weight of 4931.
(*2) BZ: Benzene.
(*3) DCE: Dichloroethane.
(*4) DO: Dooxane.
(*4) Me-THF: Methyl tetrahydrofuran.

TABLE 2

| Comp. example number | Components | | | | | | Chain transfer agent | | Result | | | Comparison of viscosity of polymerization system ($\eta$ rel.) | |
|---|---|---|---|---|---|---|---|---|---|---|---|---|---|
| | Polybutadiene B (g.) | MAH (g.) | IBVE (g.) | BPO (mg.) | Solvent | | | | | Elementary analysis | | Before polymerization | After polymerization |
| | | | | | Name | Amount (ml.) | Name | Amount (ml.) | Yield (g.) | H (percent) | C (percent) | | |
| 1 | | 5 | 3.9 | 10 | BZ | 45 | THF | 5 | —*1 | | | | |
| 2 | | 5 | 3.9 | 10 | DO | 45 | THF | 5 | 3.2*2 | 7.8 | 57.4 | 1 | 3.6 |
| 3 | 5 | 5 | | 10 | DCE | 50 | THF | 5 | 4.9*3 | 11.2 | 85.2 | 3.1 | 3.4 |

Note: (*1) The copolymer of MAH and IBVE was insoluble in benzene but, when it was left to stand in methanol, acid anhydride group in the copolymer was esterified by half and the copolymer dissolved in methanol.

(*2) The copolymer was precipitated in methanol and immediately recovered therefrom without allowing it to stand therein.

(*3) When the polymerization mixture was placed in methanol and left to stand for 1 day, the polymer was partially precipitated with the other portion dispersed in white color.

Example 20

In 50 ml of benzene was dissolved 5 g of polybutadiene C (containing 100 mol percent 1,4-polymer in cis form and having a molecular weight of 35000) which had been washed with methanol and acetone. To the solution were further added 5 g of MAH and 3.9 g of IBVE, and the resulting solution was placed in polymerization tube. After substituting nitrogen gas for the air in the tube, the tube was irradiated with ultraviolet rays by a 75-watt high-pressure mercury lamp from a position 8 cm away from the tube. The irradiation was conducted at 25°C for 4 hours. As a result, the viscosity of the product increased. After the product was precipitated in methanol for 2 days, the copolymer was recovered. Elementary analysis on the copolymer obtained gave 9.1 wt.% of hydrogen and 71.3 wt.% of carbon.

Example 21

In 50 ml of chloroform were dissolved 1 g of raw rubber, 2 g of MAH, 2 g of EVE and 20 ml of THF, and the solution thus prepared was placed in a polymerization tube made of glass. After substituting nitrogen gas for the air in the tube, the tube was irradiated with ultraviolet rays by a 75-watt high-pressure mercury lamp from a position 2 cm away from the tube. The irradiation was conducted at 25°C for 2 hours and 20 minutes, whereby the polymerization system was rendered highly viscous. The product obtained was precipitated in methanol to recover the polymer. The result of elementary analysis on the copolymer showed that it comprised 10.6 wt.% of hydrogen and 77.0 wt.% of carbon.

Example 22

5 g of copolymer of butadiene-acrylonitrile ($[\eta]_{MEK}^{30°C}$ =0.13, acrylonitrile 38.6 mole percent), 5 g of MAH, 3.9 g of IBVE, 20 mg of BPO, 45 ml of benzene and 5 ml of THF were mixed together and placed in a polymerization tube. After substituting nitrogen gas for the air in the tube, the mixture was heated at 60°C for 4 hours. During the reaction, the viscosity of the system increased slightly. The product was precipitated in methanol to recover the polymer. Elementary analysis on the polymer gave 8.8 wt.% of hydrogen, 75.5 wt.% of carbon and 8.4 wt.% of nitrogen.

Example 23

1 g of styrene-butadiene copolymer (having a molecular weight of about 200,000 and comprising 23.5 mole percent of styrene and 76.5 mole percent of butadiene) was dissolved in xylene and the copolymer was precipitated in methanol. After repeating this procedure twice, the resulting precipitate was dried and to the dried precipitate were added 2 g of MAH, 2 g of IBVE, 20 ml of THF and 50 ml of chloroform. The mixture thus prepared was then placed in a polymerization tube, into which nitrogen gas was introduced to drive out the air. The tube was then irradiated by a 75-watt high-pressure mercury lamp spaced apart therefrom by 2 cm for 3 hours. The system was rendered highly viscous and the product obtained was precipitated in methanol. The polymer recovered and dried was found to comprise 9.3 wt.% of hydrogen and 85.5 wt.% of carbon.

Example 24

5 g of polybutadiene A, 5 g of MAH, 5 ml of THF, 3.5 g of α-methylmethyl vinyl ether and 45 ml of benzene were mixed together and the mixture was placed in a polymerization tube. After driving out the air therefrom by nitrogen gas substitution, the tube was sealed and irradiated by a 75-watt high-pressure mercury lamp spaced apart therefrom by 2 cm for 3 hours. Elementary analysis on the polymer recovered after precipitating the product in methanol gave 10.0 wt.% of hydrogen and 76.5 wt.% of carbon.

Example 25

5 g of polybutadiene A, 5 g of MAH, 3.5 g of β-methylmethyl vinyl ether, 5 ml of THF and 45 ml of benzene were mixed together and the mixture was placed in a polymerization tube. After driving out the air from the tube by nitrogen gas substitution, the tube was sealed and irradiated by a 75-watt high-pressure mercury lamp spaced apart from the tube by 2 cm for 6 hours. Elementary analysis on the copolymer recovered after precipitating the resultant product in methanol gave 10.3 wt.% of hydrogen and 79.8 wt.% of carbon.

Example 26

5 g of polybutadiene A, 5 g of MAH, 4 g of dioxene, 50 ml of benzene and 10 mg of PBO were mixed together and placed in a polymerization tube. After driving out the air from the tube by nitrogen gas substitution, the mixture was heated at 60°C for 2 hours, whereby the viscosity of the system was increased slightly. The product was precipitated in methanol and a polymer was recovered. The result of elementary analysis on the polymer showed that it comprised 11.0 wt.% of hydrogen and 82.0 wt.% of carbon.

Example 27

5 g of polybutadiene A, 2 g of 2-methylfuran, 2.5 g of MAH and 100 mg of AIBN were dissolved in 50 ml of benzene, and the solution thus prepared was placed in a polymerization tube. After driving out oxygen by nitrogen gas substitution the tube was irradiated for 10 hours by a 75-watt high-pressure mercury lamp from a position 5 cm away from the tube. The result of elementary analysis on the recovered polymer was 10.2 wt.% hydrogen and 85.5 wt.% carbon.

Example 28

0.5 g of polybutadiene A, 0.2 g of monochloromaleic anhydride, 0.16 g of IBVE, 0.5 ml of THF and 5 mg of BPO were dissolved in 5 ml of benzene, and the copolymerization was conducted in the same manner as in Example 1. The result of elementary analysis of the copolymer obtained showed that it contained 83.0 wt.% of carbon, 11.0 wt.% of hydrogen and 2.2 wt.% of chlorine.

Example 29

5 g of polybutadiene B, 2.5 g of MAH, 2.5 g of methyl maleic anhydride, 3.9 g of IBVE and 10 mg of BPO were dissolved in 50 ml of benzene, and the copolymerization was conducted in the same manner as in Example 1. The result of elementary analysis of the copolymer obtained showed that it contained 83.5 wt.% of carbon and 10.0 wt.% of hydrogen.

What we claim is:

1. A process for manufacturing a graft-copolymer which comprises copolymerizing at −20°C to 220°C, (a) 100 parts by weight of a polymer having carbon-carbon double bonds in the molecule, a bromine value of 50 to 300 and a molecular weight of 200 to 300,000 selected from the group consisting of conjugated diolefin polymers, raw rubber, guttaperca, balata, chicle and copolymer containing at least 20 percent by weight of conjugated diolefin or acetylene obtained by reacting conjugated diolefin or acetylene with a monomer selected from the group consisting of those represented by the formula of:

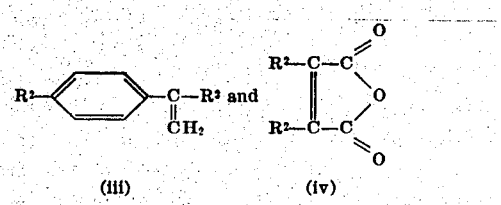

wherein $R^2$ is hydrogen atom or methyl group and $R^3$ is hydrogen atom or an alkyl group having one to five carbon atoms, with (b) 5 to 300 parts by weight of a maleic anhydride compounds selected from the group consisting of maleic anhydride, monochloromaleic anhydride, monomethyl maleic anhydride and dimethylmaleic anhydride and (c) 5 to 300 parts by weight of a vinyl ether compound having in the molecule a vinyl group of the formula of

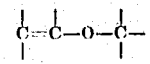

selected from the group consisting of those represented by the formula of:

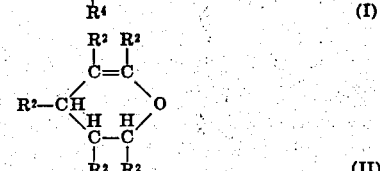

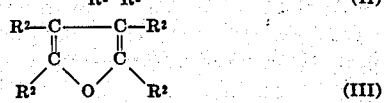

and

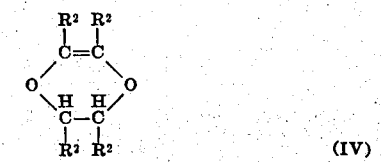

wherein $R^2$ is hydrogen atom or methyl group, $R^4$ is an alkyl group having one to 17 carbon atoms or a halogenated alkyl group having one to 17 carbon atoms and $R^5$ is hydrogen atom or an alkyl group having one to two carbon atoms.

2. A process for manufacturing a graft-copolymer according to claim 1, in which said reaction temperature is applied at −20°C to 150°C in the presence of a radical polymerization initiator.

3. A process for manufacturing a graft-copolymer according to claim 1, in which said reaction temperature is applied at 120°C to 220°C in the absence of a radical polymerization initiator.

4. A process for manufacturing a graft-copolymer according to claim 1, in which said diene polymer is polymer of butadiene, isoprene or chloroprene.

5. A process for manufacturing a graft-copolymer according to claim 1, in which said vinyl ether compound is at least one species selected from the group consisting of methyl vinyl ether, ethyl vinyl ether, propyl vinyl ether and butyl vinyl ether.

6. A process for manufacturing a graft-copolymer according to claim 1, in which said polymer has a bromine value of 150 to 300 and a molecular weight of 500 to 50,000.

7. A process for manufacturing a graft-copolymer according to claim 1, in which said polymer contains in the molecule 1,2-vinyl type butadiene in the amount of at least 10 percent by weight.

8. A process for manufacturing a graft-copolymer according to claim 1, in which said polymer is copolymerized with 10 to 200 parts by weight of the maleic anhydride compound and with 10 to 200 parts by weight of the vinyl ether compound, based on 100 parts by weight of the polymer.

9. A process for manufacturing a graft-copolymer according to claim 1, in which said copolymerization is further carried out in the presence of at least one graft-copolymer chain transfer agent selected from the group consisting of those represented by the formula of

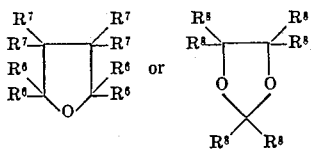

wherein $R^6$ and $R^7$ are hydrogen atoms, halogen atoms, alkyl group having one to two carbon atoms, halogenated methyl group or phenyl group, and at least one $R^6$ must be hydrogen atoms; and $R^8$ is hydrogen atom or alkyl group having one to two carbon atoms, and at least one $R^8$ must be hydrogen atom.

10. A process for manufacturing a graft-copolymer according to claim 9, in which said graft-copolymer chain transfer agent is used in the amount of not more than 40 percent by weight based on the total weight of the starting materials to be copolymerized.

11. A process for manufacturing a graft-copolymer according to claim 9, in which said graft-copolymer chain transfer agent is at least one species selected from the group consisting of tetrahydrofuran, 2-methyl-tetrahydrofuran, 2-ethyltetrahydrofuran, 3-methyltetrahydrofuran, 2,2-dimethyltetrahydrofuran, 2,5-dimethyltetrahydrofuran, 2,3-trans-dichlorotetrahydrofuran, 2-chloromethyltetrahydrofuran, 2-phenyltetrahydrofuran, dioxolan, 2-methyldioxolan, 2,2-dimethyldioxolan, 2,4-dimethyldioxolan and 2-ethyldioxolan.

* * * * *